United States Patent
Dalal et al.

(10) Patent No.: US 8,474,723 B2
(45) Date of Patent: Jul. 2, 2013

(54) METHOD FOR OPTIMIZING AUTO-EXPOSURE PERFORMANCE OF AN IMAGING DEVICE

(75) Inventors: Yusuf Dalal, Hicksville, NY (US); David S. Koch, Islip, NY (US); Alan J. Epshteyn, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1111 days.

(21) Appl. No.: 12/055,662

(22) Filed: Mar. 26, 2008

(65) Prior Publication Data

US 2009/0242640 A1    Oct. 1, 2009

(51) Int. Cl.
 *G06K 7/10* (2006.01)
(52) U.S. Cl.
 USPC ............. 235/462.42; 235/462.11; 235/462.41
(58) Field of Classification Search
 USPC ............. 235/462.11, 462.32, 462.41, 462.42
 See application file for complete search history.

(56) References Cited

U.S. PATENT DOCUMENTS

| | | | |
|---|---|---|---|
| 4,460,264 A | 7/1984 | Winter | |
| 6,701,077 B2 | 3/2004 | Cornell et al. | |
| 7,240,844 B2 | 7/2007 | Zhu et al. | |
| 7,568,628 B2 * | 8/2009 | Wang et al. | 235/462.45 |
| 2004/0232236 A1 | 11/2004 | Wilde et al. | |
| 2006/0180670 A1 | 8/2006 | Acosta et al. | |
| 2006/0202036 A1 | 9/2006 | Wang et al. | |

OTHER PUBLICATIONS

VLSI Vision Limited, Vision VV5430 Monolithic Sensor, Sep. 4, 1997, 1-32.*
International Search report dated Dec. 24, 2009 in related case PCT/US09/38330.
Notice of Allowance mailed on Mar. 29, 2012 in European Patent Application No. 09724016.2.
International Preliminary Report on Patentability and Written Opinion for International Patent Application No. PCT/US2009/038330 mailed on Oct. 7, 2010.
Notice of Allowance mailed on May 15, 2012 in Australian Patent Application No. 2009228233.
Office Action mailed on Oct. 26, 2011 in Chinese Patent Application No. 200980110235.3.
European Search Report dated Jun. 29, 2011 in related European application 09724016.2.
Office Action dated Apr. 4, 2011 in related Australia application 2009228233.
Office Action dated Aug. 15, 2011 in related Australia application 2009228233.
English Translation of Office Action issued on Jul. 17, 2012 in Chinese Patent Application No. 200980110235.3.
Office Action mailed on Sep. 25, 2012 in Canadian Patent Application No. 2719583.

* cited by examiner

*Primary Examiner* — Daniel Hess

(57) ABSTRACT

An imaging device includes an illumination element; an auto-exposure element; and a processor disabling the auto-exposure element and subsequently disabling the illumination element.

13 Claims, 3 Drawing Sheets

METHOD FOR OPTIMIZING AUTO-EXPOSURE PERFORMANCE OF AN IMAGING DEVICE

FIELD OF THE INVENTION

The present invention relates generally to devices and methods for improving the performance of scanners.

BACKGROUND

Scanners typically disable a number of elements when not in active use to conserve power. Among elements typically disabled in this manner is an illumination element that enables imaging in low light conditions. When the illumination element is re-enabled, there is typically a momentary blinding effect that causes a number of frames to be too bright to contain useful information because an auto-exposure function of the imager has been adjusted to the low lighting condition caused by the turning off of the illumination element.

SUMMARY OF THE INVENTION

The present invention relates to a method and an imaging device. The imaging device includes an illumination element; an auto-exposure element; and a processor disabling the auto-exposure element and subsequently disabling the illumination element.

DETAILED DESCRIPTION

Figure 1:
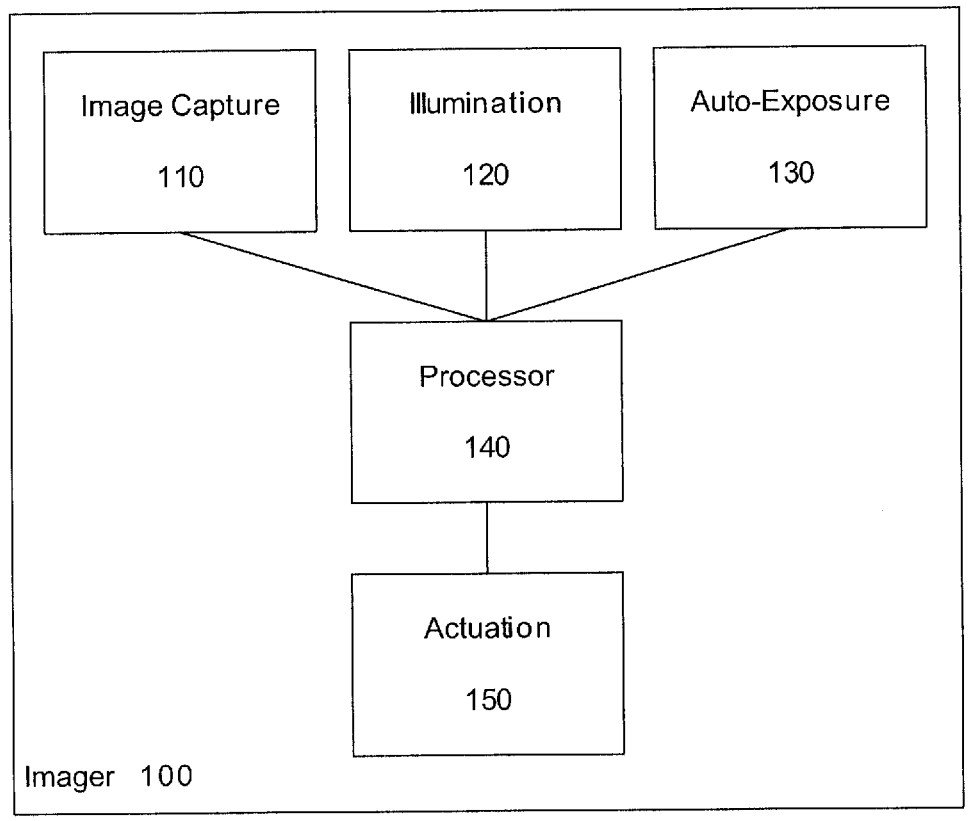
FIG. 1 shows an exemplary system according to the present invention.

The exemplary embodiments of the present invention may be further understood with reference to the following description and the appended drawings, wherein like elements are referred to with the same reference numerals. The exemplary embodiments of the present invention describe systems and methods for improving scanning performance.

Throughout this description, the terms "scanner" and "imager" will be used interchangeably to describe any device or component that is capable of collecting data corresponding to an image. Examples of a scanner may include a 2-d imager, a camera, etc. Consequently, the terms "scanning" or "imaging" refer to the process of collecting the image data by the scanner or imager. Those skilled in the art will understand that the exemplary embodiments of the present invention may be implemented on any type of scanner.

A typical scanner may include an integrated illumination means for lighting bar codes or other images that may be scanned. The illumination means may be any light source illumination of the imaging device. Examples of light sources may include a light emitting diode ("LED"), a diffracted laser beam, etc. A scanner may also include an auto-exposure means for optimizing image capture. The auto-exposure typically may observe lighting conditions (e.g., ambient light, light provided by illumination means, etc.) and determine settings to be used (e.g., exposure, gain, etc.) in order to optimize image capture.

One common concern in the design of mobile devices, such as scanners, is the desire to optimize battery life. To this end, scanners are often designed to disengage elements when not in active use. Typical existing scanners may disengage illumination, which often consumes a large amount of power, in order to conserve power when the scanning process is not being used. However, because the powering up of some components of the scanner is a relatively long process, the imager and auto-exposure are typically left running in order to enable more rapid response to a new activation (e.g., a trigger pull). While the illumination is disengaged, the auto-exposure adjusts for low lighting conditions. When the scanner is re-activated (e.g., a trigger is pulled), the reactivation of the illumination causes the imager to experience a momentary "blinding" effect as the auto-exposure adjusts from the previous low lighting conditions to a suddenly brightened environment. This in turn may cause degradation in performance, as the first few frames captured by the imager are too bright to contain useful information.

The exemplary embodiments of the present invention address this performance degradation by taking a different approach to power conservation when an imager is not in active use. FIG. 1 illustrates a functional representation of an exemplary imager 100 according to the present invention. The imager 100 may contain an image capture means 110, which may be a camera or other similar system for recording an image for processing. The imager 100 may also include an illumination means 120. The illumination means 120 may be any suitable system for lighting an object or image that is being scanned by the imager 100 in order to aid in obtaining usable data. In some embodiments of the present invention, the illumination means may be a diffused laser; in other embodiments, it may be a simple directed light beam.

The imager 100 may also contain an auto-exposure element 130 for automatically determining optimal image capture settings (e.g., exposure, gain, etc.) to enhance the performance of the imager 100. The auto-exposure element may be a dedicated hardware component or may be software that is executed by a processor 140; the processor may also execute various other software that operates the imager 100. The imager 100 may also contain an actuation means 150, by which a user may enable and disable image capture. The actuation means 150 may be, for example, a trigger, a button, etc.

Figure 2:
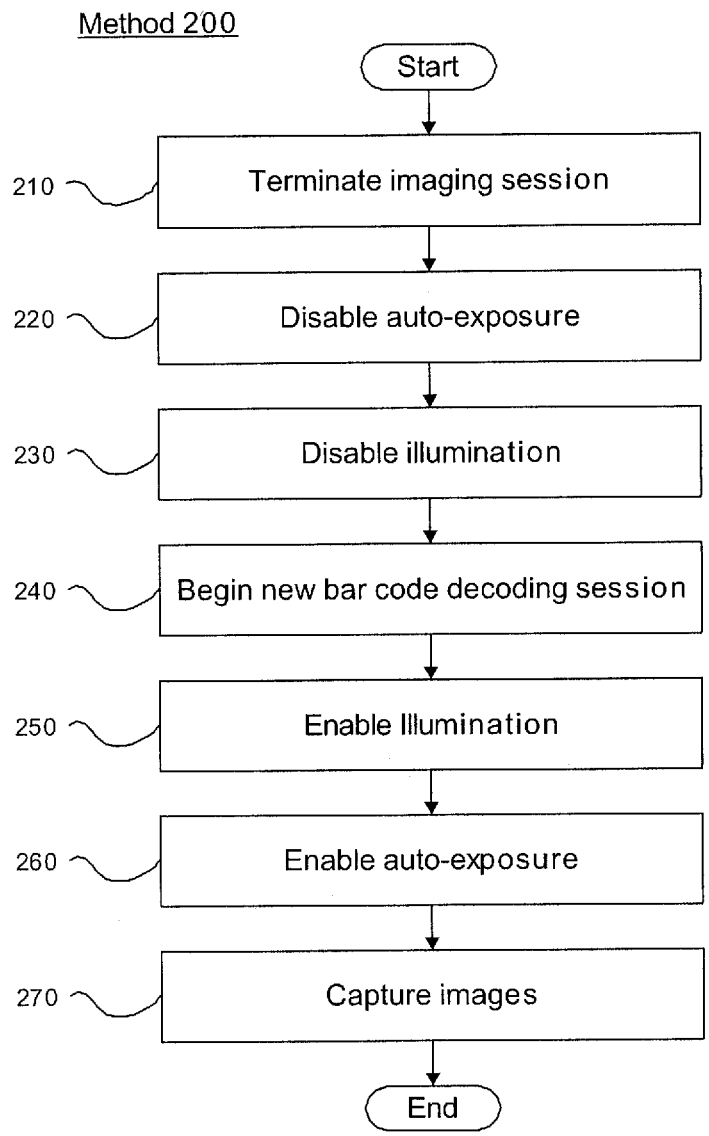
FIG. 2 shows an exemplary method according to the present invention.

FIG. 2 illustrates an exemplary method 200 according to the present invention. The method 200 will be described with reference to the exemplary imager 100 of FIG. 1, but those of skill in the art will understand that the method 200 may also be applied by any other combination of components capable of performing the method 200.

When the method 200 begins, the imager 100 is currently actively scanning images. Typically, this may mean that the actuation means 150 is active (e.g., if the actuation means 150 is a trigger, the trigger is pulled; if the actuation means 150 is a button, the button is pressed; etc.), and the image capture means, illumination means 120 and auto-exposure element 130 are all active. In step 210, the user disengages the actuation means 150 (e.g., releases the trigger or button, etc.). Those of skill in the art will understand that in other exemplary embodiments of the present invention, the termination may occur automatically, such as in response to a signal from a host device that scanning has been accomplished successfully, rather than in response to a user action. In step 220, the auto-exposure element 130 is disabled. Once step 220 has been performed, the auto-exposure element 130 ceases to modify settings that it controls (e.g., exposure, gain, etc.), but the image capture means 110 remains active with settings that were determined before step 220 (e.g., with existing ambient light coupled with light generated by the illumination means 120).

In step 230, the illumination means 120 is disengaged; as a result, the only light remaining is ambient light. In a preferred embodiment of the present invention, a time delay between steps 220 and 230 may be on the order of a range of 1 microsecond and 1 second (e.g., 2-3 microseconds). The image capture means 110 remains active using the settings described above. Images obtained using these settings will not be optimal, because the settings are optimized for conditions with more light, but this is inconsequential as these images are simply ignored. These conditions are maintained while the actuation means 150 is disengaged, resulting in reduced power consumption when the imager 100 is not being actively used.

In step 240, the user engages the actuation means 150 (e.g., pulls the trigger, presses the button, etc.) to begin actively using the imager 100. In step 250, the illumination means 120 is engaged. In step 260, the auto-exposure element 130 is enabled. Ideally, the auto-exposure element 130 should be re-enabled as soon as possible after the illumination means 120 is re-engaged; in a preferred embodiment of the present invention, the time delay between steps 250 and 260 (e.g., the time required to re-enable the auto-exposure element 130) may be on the order of a range of 1 microsecond and 1 second (e.g., 5 microseconds). Prior to step 260, the image capture means 110 maintains the previous set of capture settings used in the prior image capture session and last updated before the auto-exposure element was disengaged in step 220. Thus, when the auto-exposure 130 is re-engaged, its existing seed values are appropriate for lighting conditions with the illumination means 120 engaged, resulting in a more rapid adjustment to correct exposure settings. Finally, in step 270, the imager 100 begins capturing images.

Figure 3:
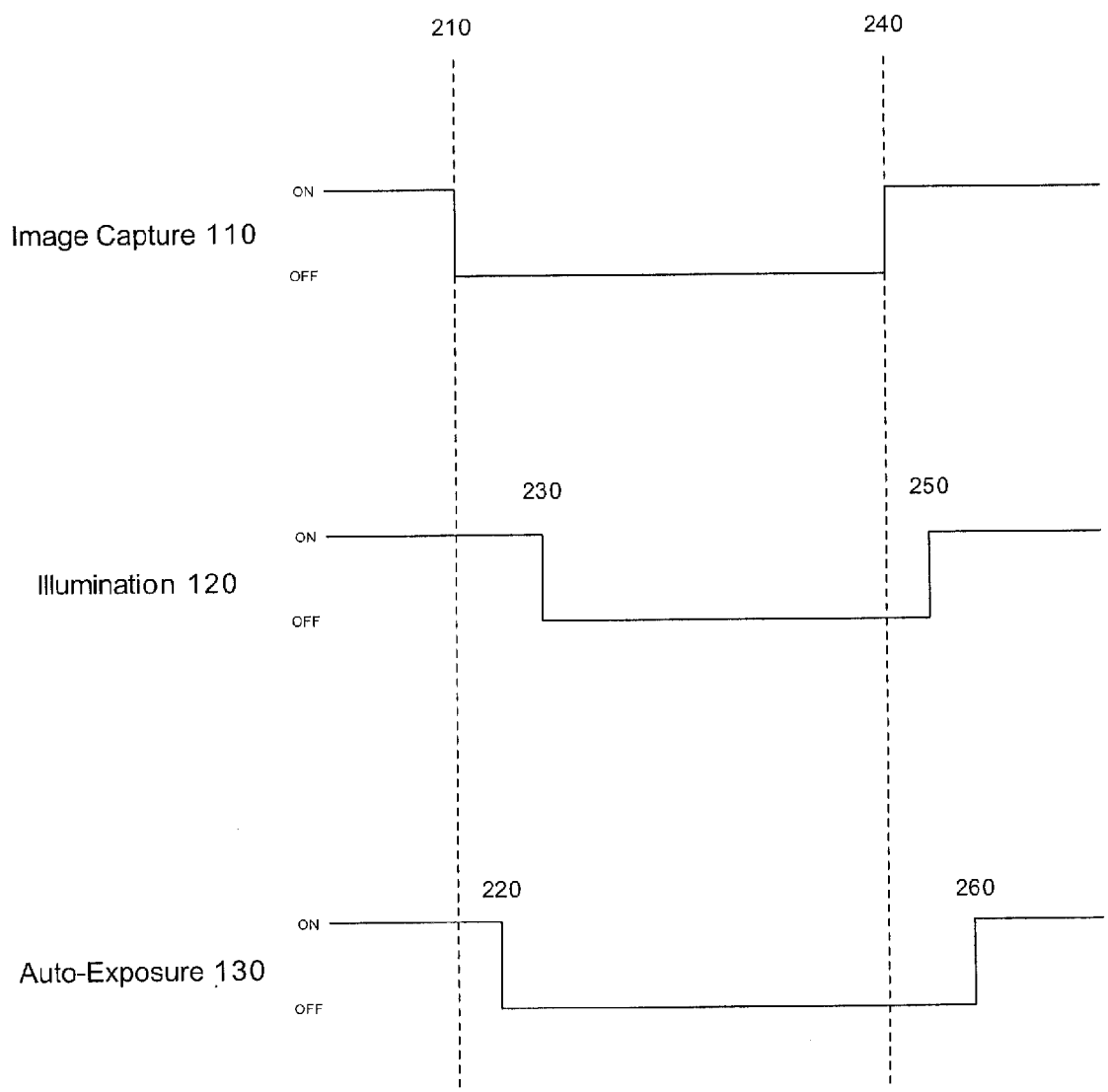
FIG. 3 shows a time plot of the power status of the elements of the exemplary system of FIG. 1 during the application of the exemplary method of FIG. 2.

FIG. 3 illustrates the enabled/disabled status of the components of the imager 100 of FIG. 1 as a function of time, during the application of the exemplary method 200 of FIG. 2. As will be clear, time is plotted horizontally in FIG. 3. Steps 210 and 240 are highlighted for emphasis because they represent action by the user of the imager 100.

As FIG. 3 shows, in step 210 the image capture element 110 is disengaged; as discussed above, this may be due to user action or may occur automatically. After a time delay, the auto-exposure element 130 is disengaged in step 220. Subsequently, after another time delay, the illumination element 120 is disengaged in step 230. When a user begins actively using the imager again in step 240, the illumination element 120 is subsequently re-enabled in step 250. Finally, the auto-exposure element 130 is re-enabled in step 260. Those of skill in the art will understand that the time lapses between steps 210 and 220, 220 and 230, 240 and 250, and 250 and 260 may be predetermined, while the time lapse between steps 230 and 240 may depend on the actions of the user of the device 100.

By the application of the exemplary embodiments of the present invention, it may be possible to achieve improved imaging performance. Because an imager may be reactivated with a set of image capture settings that persist from a previous imaging session, the first frames that are captured may contain enough information to be useful. Further, because the auto-exposure uses its previous image capture settings as a baseline when calculating new settings when it is re-enabled, and because the previous settings are appropriate for imaging with illumination enabled, the time to determine optimal new settings may be reduced. As a result, the time to decoding may be improved. This performance improvement may be accomplished while retaining the power savings accomplished by previously existing designs.

It should be noted that in other embodiments of the present invention, the same principles may be applied to an imager that lacks illumination. In such embodiments, when an imaging session ends, the auto-exposure may be disabled and the image capture settings may be saved in a memory. When an imager is not in active use, it may be placed on a table, a stand, pointed at the floor, in a cabinet or drawer, or in some other orientation that may change the environment, and therefore the lighting conditions and the exposure settings that would result if the auto-exposure were to remain enabled. Subsequently, once a new imaging session begins, the auto-exposure may be re-enabled using the saved settings, resulting in the same benefits resulting in improved time to decode as described above.

Those of skill in the art will understand that the above described exemplary embodiments may be implemented in any number of manners, including as a separate software module, as a combination of hardware and software, etc. For example, the auto-exposure 130 may be a program containing lines of code that, when compiled, may be executed by a processor.

The present invention has been described with reference to the above specific exemplary embodiments. However, those of ordinary skill in the art will recognize that the same principles may be applied to other embodiments of the present invention, and that the exemplary embodiments should therefore be read in an illustrative, rather than limiting, sense.

What is claimed is:

1. A method, comprising:
   disabling an auto-exposure of an imager in response to a first instruction, the auto-exposure ceasing to modify a first set of image capturing settings for the imager; and
   disabling, after the auto-exposure has been disabled, an illumination element of the imager, wherein an image capture means of the imager remains active and uses the first set of image capture setting determined prior to the disabling of the auto-exposure to optimize power consumption of the imager;
   re-enabling the illumination element in response to a second instruction; and
   re-enabling, after the illumination element has been re-enabled, the auto-exposure, wherein the image capture means of the imager maintains the first set of image capture settings used in prior image capture session as a set of seed values for the auto exposure.

2. The method of claim 1, wherein a first time delay between disabling the auto-exposure and disabling the illumination element is in a range of 1 microsecond to 1 second.

3. The method of claim 1, wherein a second time delay between re-enabling the illumination element and re-enabling the auto-exposure is in a range of 1 microsecond to 1 second.

4. The method of claim 1, wherein the second instruction is received via one of a trigger and a button.

5. The method of claim 1, wherein the illumination element is one of a laser, a diffused laser and an LED.

6. The method of claim 1, wherein the auto-exposure is one of a software module and a hardware module.

7. An imaging device, comprising:
   an illumination element;
   an auto-exposure element; and
   a processor disabling the auto-exposure element and subsequently disabling the illumination element in response to a first instruction, the auto-exposure element ceasing to modify a first set of image capturing setting for the imaging device, wherein an image capture means of the device remains active in response to the first instruction and uses the first set of image capture settings determined prior to the disabling of the auto-exposure to optimize power consumption of the device; and further wherein the processor re-enabling the illumination element and subsequently re-enabling the auto-exposure in response to a second user input, wherein the image capture means of the device maintains the first set of image capture settings used in prior image capture session as a set of seed values for the auto exposure.

8. The device of claim 7, wherein the auto-exposure element and the illumination element are disabled one of in response to a first user input and automatically.

9. The imaging device of claim 8, wherein the first user input and the second user input is one of a trigger and a button.

10. The imaging device of claim 7, wherein a first time delay between disabling the auto-exposure element and disabling the illumination element is in a range of 1 microsecond to 1 second.

11. The imaging device of claim 7, wherein a second time delay between re-enabling the illumination element and re-enabling the auto-exposure is in a range of 1 microsecond to 1 second.

12. The imaging device of claim 7, wherein the illumination element is one of a laser, a diffused laser and an LED.

13. The imaging device of claim 7, wherein the auto-exposure is one of a hardware module and a software module.

\* \* \* \* \*